United States Patent [19]

Wheeler, III et al.

[11] Patent Number: 4,542,915

[45] Date of Patent: Sep. 24, 1985

[54] CARRIAGE ASSEMBLY

[76] Inventors: Charles E. Wheeler, III; Kathleen J. Wheeler, both of 10800 Overseas Hwy., Marathon, Fla. 33050

[21] Appl. No.: 526,272

[22] Filed: Aug. 25, 1983

[51] Int. Cl.⁴ .............................................. B62B 7/08
[52] U.S. Cl. .................................... 280/642; 296/102; 297/DIG. 4; 280/47.39; 280/650; 280/658
[58] Field of Search ............... 280/642, 643, 644, 647, 280/648, 649, 650, 658, 47.38, 47.39, 47.4; 296/102; 297/240, 243, 245, 93, 94, DIG. 4

[56] References Cited

U.S. PATENT DOCUMENTS

| | | | |
|---|---|---|---|
| 2,857,953 | 10/1958 | Berger et al. | 297/243 |
| 2,993,702 | 7/1961 | Gill | 280/47.4 X |
| 3,223,431 | 12/1965 | Gottfried et al. | 297/243 |
| 3,235,279 | 2/1966 | Smith et al. | 280/648 |
| 3,309,101 | 3/1967 | Romay | 280/47.38 |
| 4,398,748 | 8/1983 | Durignacq | 280/644 |
| 4,449,732 | 5/1984 | Surot | 280/644 |

FOREIGN PATENT DOCUMENTS 2462323  3/1981  France ............................. 280/650

Primary Examiner—Joseph F. Peters, Jr.
Assistant Examiner—Mark C. Dukes
Attorney, Agent, or Firm—John Cyril Malloy

[57] ABSTRACT

A carriage assembly of the type designed to concurrently carry one occupant in each of two seat assemblies movably positioned and supported on the frame of the carriage in a manner such that both of the seat assemblies may be positioned to face in opposite directions either toward the front or rear of the carriage assembly. The entire frame assembly is supported on wheel means which supports the carriage assembly over the surface which it travels. The frame assembly is further structured to be collapsed into an inoperative position for storage.

14 Claims, 11 Drawing Figures

CARRIAGE ASSEMBLY

BACKGROUND OF THE INVENTION

1. Field of the Invention

This invention relates to a carriage assembly of the type capable of holding a plurality of occupants in individual seat assemblies and the seat assemblies are capable of facing either toward the front or rear of the carriage assembly and move independently of one another into the desired position.

2. Description of the Prior Art

Carriages used for the transportation of infants or small children have been known in the prior art for many years. Typically, such carriages are structured to include a single infant in a seat structure which is designed to face the front of the carriage. The carriage is normally propelled by manual pushing wherein the frame of the carriage assembly includes some type of wheel structure disposed in supporting relation thereto relative to the surface over which the carriage is intended to travel. Also, such prior art carriages frequently include a roof or shield structure disposed ove the top of the carriage to protect the occupant against the glare of the sun or other adverse conditions.

Other structural features generally present in the prior art is the ability to collapse or "break down" the carriage assembly for storage or transportation as when placing the carriage in an automobile or the like.

However, while carriage structures of the type set forth above are well known and commercially available, a number of these assemblies include certain structural features that render such assemblies less than desirable. For example, frequently the carriage assemblies have a single seat structure which is fixedly attached to the frame and not positionable to allow the horizontal inclination of the seat assembly as when the occupant goes to sleep. Also, it is sometimes difficult and requires more than one person or the exertion of great manual effort to break down or collapse the carriage assembly into a compacted position for storage.

Accordingly, there is a need in the industry for a carriage assembly which is structured to provide the versatility of carrying more than one occupant such as two infants in individual seat assemblies. Such a preferred carriage assembly would include the seat assemblies being selectively positionable independent of one another and between an upright or substantially horizontally inclined position. Further, the seat assemblies can face either the front or the rear of the carriage assembly as preferred. In addition, such a preferred structure should be capable of easy break down or disposition into the compacted stored position.

SUMMARY OF THE INVENTION

The present invention relates to a carriage assembly of the type which may be propelled by pushing over a given surface. The carriage assembly includes a frame means itself being attached to and/or supported by wheel means in the form of a plurality of wheel assemblies attached generally at the four points along the bottom of the carriage assembly frame.

Further, the carriage assembly includes two support elements each structured and disposed to movably support a seat assembly thereon. Each seat assembly includes a body support portion formed of flexible material and including a seat and backrest portion for supporting of an individual therein. Each of the seat assemblies includes a support frame which itself is pivotally attached to respective ones of the support elements for selective positioning of each of the seat assemblies either toward the rear or the front of the carriage assembly and further for positioning each of the seat assemblies on body support portions in an upright or substantially horizontally inclined position. Further, each of the seat assemblies is movable independent of one another. One occupant may desire to be positioned in an upright sitting position while the other occupant, disposed in the other seat assembly, may be positioned in a substantially horizontally inclined position for sleeping. Further, the seat assemblies are disposed for selective positioning either towards one another or away from another as desired. Specific fixing of each seat assembly in the desired attitude and position is accomplished through positioning means including a first and second link disposed in interconnecting relation between each side of the seat assembly and the correspondingly positioned portion of the support element. The two link elements may be selectively fixed relative to one another which in turn serves to fix the position of the seat assembly in the desired position and attitude relative to its support element.

The frame means of the present invention further comprises a secondary support portion disposed in substantially surrounding relation to both of the seat assemblies when they are disposed in their operative position. A handle portion similarly, is disposed in substantially surrounding relation to at least the rear of the seat assembly disposed closest to the handle portion. Both the secondary support portion and the handle portion have free ends disposed in removable attachment to one another. Further, the seat portion is pivotally connected at two points to the secondary support portion and may be pushed downward for disconnection thereto. This downward movement of the handle portion causes an upward pivoting of the secondary support portion and an entire collapsing of the frame means wherein the two seat assemblies are disposed in folded, side-by-side relation to one another.

BRIEF DESCRIPTION OF THE DRAWINGS

For a fuller understanding of the nature of the present invention, reference should be had to the following detailed description taken in connection with the accompanying drawings, in which.

Similar reference characters refer to similar parts throughout the several views of the drawings.

DETAILED DESCRIPTION OF THE PREFERRED EMBODIMENT

Figure 1:
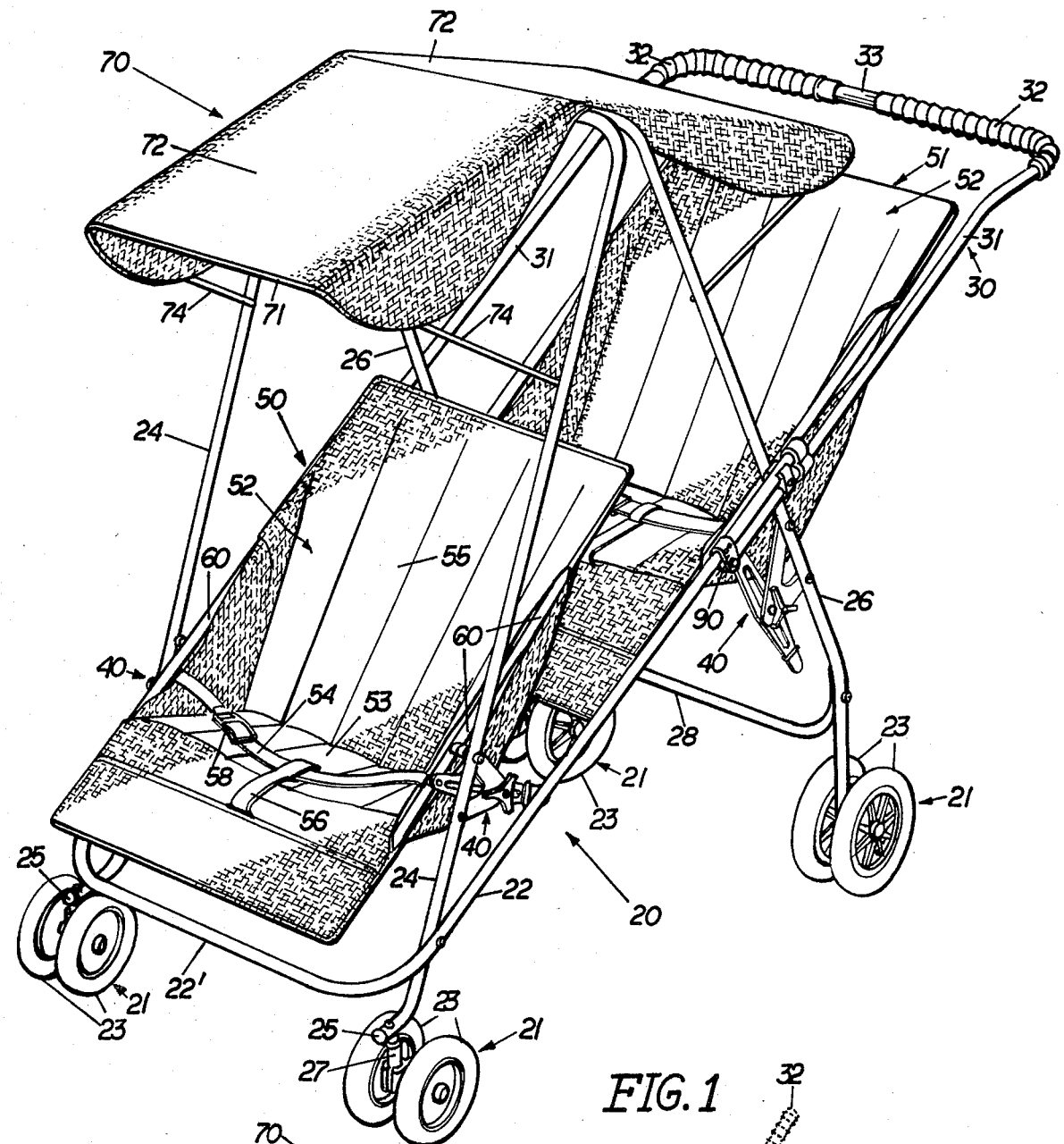
FIG. 1 is an isometric view of the subject carriage assembly in an operative position.

As best shown in FIG. 1, the carriage assembly generally indicated as 20 includes a frame means which is supported on wheel means so as to move freely over a given surface. More specifically, the wheel means comprise four wheel assemblies generally indicated as 21 and each including two wheels 23 mounted at both the front and rear of the carriage assembly. More specifically, the frame means includes a first and a second support elements 24 and 26 respectively each having a substantially U-shaped configuration defined by spaced apart, substantially parallel legs, wherein each of the legs has a free end attached to respective ones of the wheel assemblies 21. As clearly shown in FIG. 1, free ends 25 of the first support member 24 are secured to a caster structure 27 which supports each of the wheels 23. Similarly, the free ends of each of the legs of the second support element 26 is secured to some type of support or caster assembly interconnecting and supporting the individual wheels 23 located at the rear of the carriage assembly.

The frame means further compises a secondary support portion 22 also having a substantially U-shaped configuration and disposed in generally surrounding relation to a first and second seat assembly 50 and 51 respectively.

In addition, the frame means includes a handle portion generally indicated as 30 and also including a U-shaped configuration with parallel legs 31 disposed in spaced apart relation to one another. The middle or cross bar portion of the handle portion 30 is angularly oriented from the two parallel legs 31 and includes gripping means 32 disposed thereon to facilitate gripping of the portion 33 for propelling and steering of the carriage assembly 20.

Figure 3:
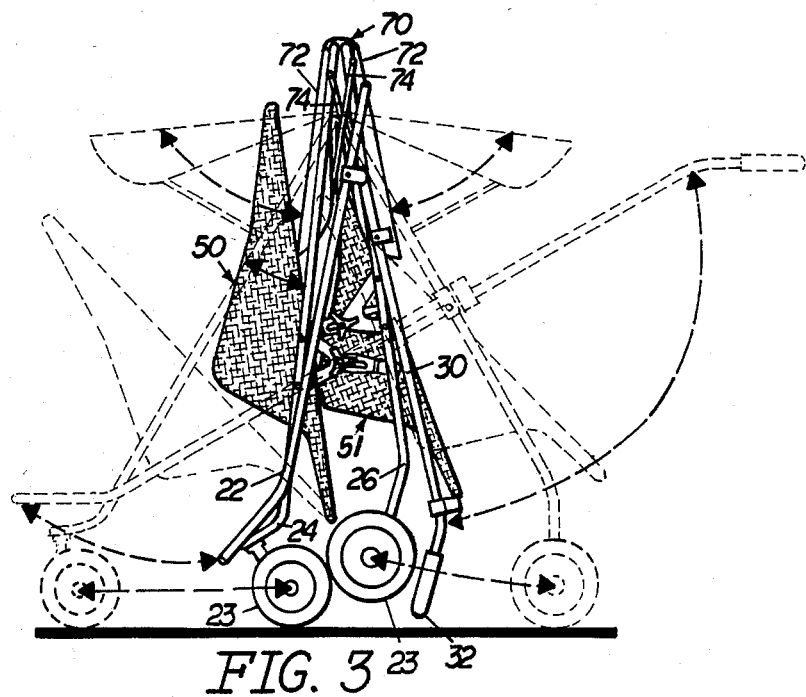
FIG. 3 is a side view of the subject carriage assembly shown in its collapsed position further showing the extended operative position of the seat assembly in broken lines.
Figure 9:
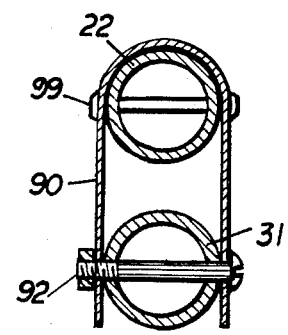
FIG. 9 is a sectional view along line 9—9 of FIG. 8.
Figure 8:
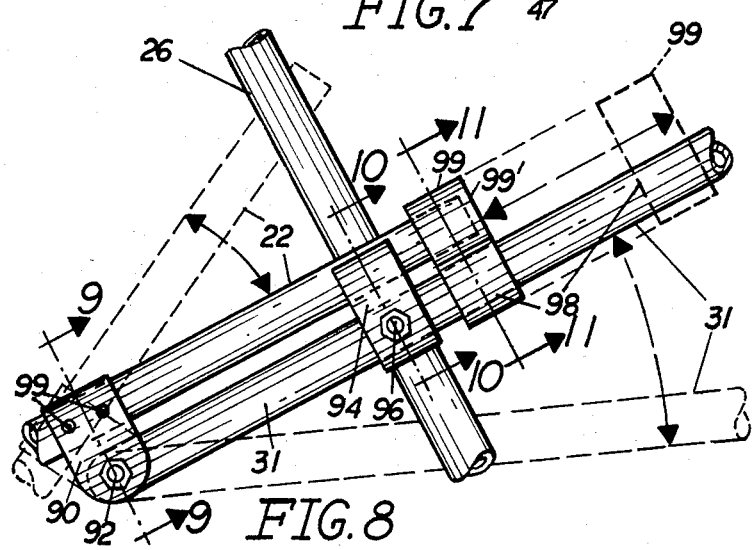
FIG. 8 is a cutaway view showing structural details of the attachment assembly interconnected to various portions of the frame carriage assembly wherein alternate positions of the structural components are shown in broken lines.
Figure 10:
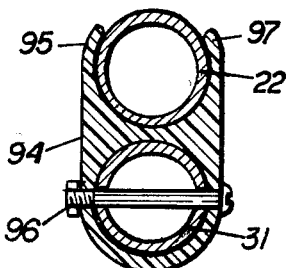
FIG. 10 is a sectional view along line 10—10 of FIG. 8.
Figure 11:
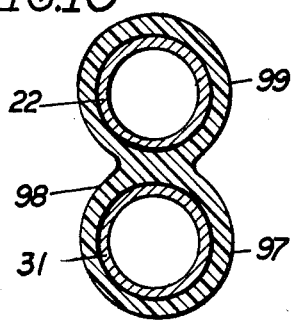
FIG. 11 is a sectional view along line 11—11 of FIG. 8.

With reference to FIGS. 1 and 3, the frame means of the carriage assembly 20 is structured for orientation of the carriage assembly in an extended, operative position as shown in FIG. 1. Further, the frame means is structured, as will be explained in greater detail hereinafter, to be disposed in a collapsed, inoperative position as shown in solid lines in FIG. 3. For the purposes of clarity, the extended, operative position referred to with regard to FIG. 1 is shown in broken lines in FIG. 3. In order to dispose and secure the carriage assembly between its extended position (FIG. 1) and its compacted position (FIG. 3), the free ends of each arm 31 of handle portion 30 are pivotally connected as at respective brackets 90 to both free ends of correspondingly positioned parallel legs of the secondary support portion 22. More specifically, with reference to FIGS. 8 and 9, the distal end of each of the arms 31 of handle portion 30 is pivotally connected to bracket 90 about the length of connector 92. In addition, bracket 92 is disposed in substantially surrounding relation to the free end of both legs of secondary support portion 22 as best shown in FIG. 9 and secured thereto by connectors 99 extending through both the bracket and the secondary support portion 22. Further, attachment means are mounted on each free end of each leg 31 and disposed and structured for connecting relation to the distal end and/or extremity of each leg of the secondary support portion 22. More specifically, the attachment means comprises one connecting element 94 disposed in secured surrounding position to each end of each leg 31 and secured thereto by connector 96 (see FIG. 10). Further, each connecting element 94 includes spaced apart fingers 95 and specifically dimensioned and configured to be removably secured to the free end portion of each leg of the secondary support portion 22 and so as to establish a snap-fit type of connection therewith. The attachment means further comprises a second connecting element 98 (see FIG. 11) having a portion disposed and configured for surrounding movable engagement as at 97 relative to each of the spaced apart leg portions 31 of handle portion 30. Also, the connecting element 98 has an additional portion also disposed in somewhat surrounding relation to the extremity of the free end of each leg of the secondary support portion 22 as best shown in FIG. 8. This cap-like portion 99 has a closed end 99' to fit over and be secured about the extremity of each leg of the secondary support portion 22. The two connecting elements 94 and 98 of the attachment means serves to secure the free end of each of the legs of the secondary support portion 22 to the similarly diposed free ends of leg portions 31 when the carriage is in its extended, operative position as shown in FIG. 1.

In order to dispose or arrange the carriage assembly 20 in its compacted and inoperative position as shown in FIG. 3, each of the connecting elements 94 and 98 is disconnected from the free end of each of the legs of the secondary support portion 22. This disconnection occurs by sliding the connecting element 98 longitudinally along the length of each leg 31. The cross bar portion 33 and the gripping elements 32 are then forced downwardly whereby disconnection of secondary support portion 22 from the other connecting element 94 occur due to the snap-fit connection referred to with regard to FIG. 10. As shown in FIG. 8, movements of the secondary support portion 22 and the legs 31 of the handle portion 30 is represented in broken lines after the disconnection therebetween has occurred. Downward pivotal movement of the handle portion 30 continues as shown by the directional arrows in FIG. 3. This in turn causes an effective collapse of the seat assemblies 50 and 51 into their compacted relation to one another as shown in FIG. 3.

Figure 4:
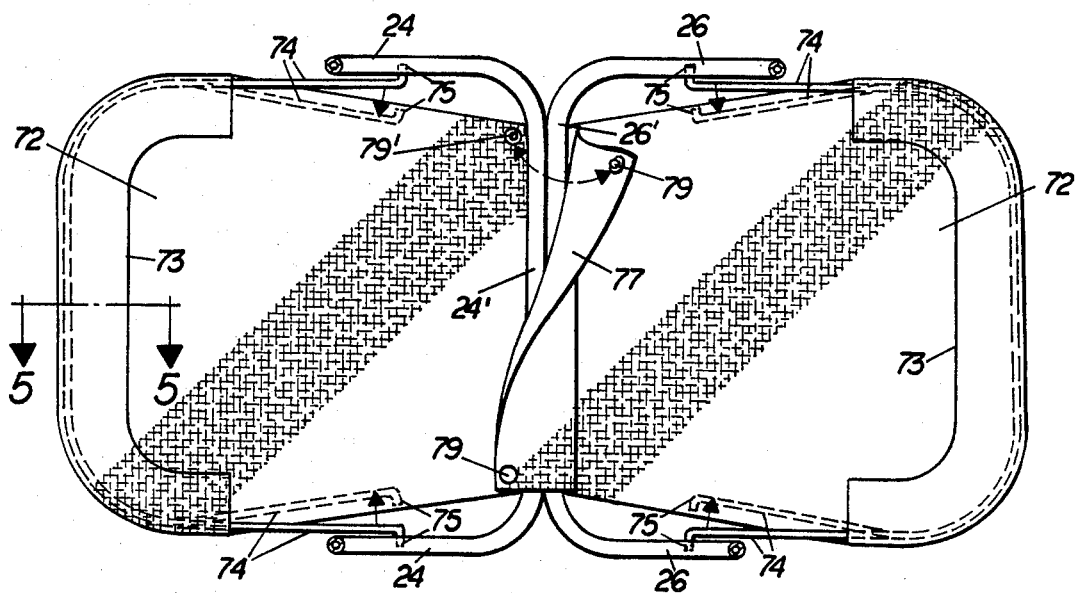
FIG. 4 is a bottom view of the shield structure comprising a roof portion of the carriage assembly.
Figure 5:
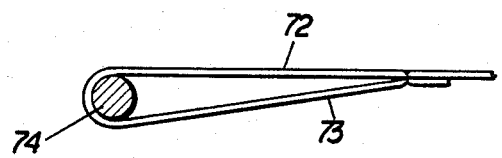
FIG. 5 is a sectional view along line 5—5 of FIG. 4.

With regard to FIGS. 1, 4 and 5, the carriage assembly 20 further includes a shield means or roof structure generally indicated as 70. This structure includes two overhanging portions 72 extending outwardly from a junction of the cross bars 24' and 26' above the seat assemblies 50 and 51. The interconnection of the cross bars 24' and 26' is insured through the provision of a sleeve element 77 snap-fitted in surrounding relation to the adjacent cross bars 24' and 26' wherein the snap-fit occurs as at 79 and 79'. Such snap connectors have substantially conventional structure and configuration. The entire shield means 70 is readily removed from its connecting position merely by disengaging of the sleeve 77 and the separation of the snap elements 79 and 79'. Further, each of the overhanging portions 72 are supported about a portion of their respective peripheries by a support rod 74 having a curvilinear configuration which conforms to the frontmost or leading edge of each of the overhanging portions 72 as at 71. More specifically, each of the supporting rods 74 are encased, at least in part, by an overfolded flap 73 secured to the interior surface of each of the overhanging portions 72 as best shown in the bottom view of FIG. 4. For removal of the roof or shield means 70 from the position shown in FIG. 1, the sleeve portion 77 is disconnected from its engaging relation to the cross bars 24' and 26'. Also, the opposite extremities 75 of each of the supporting rods 74 are removed from an aperture formed in the upper portions of each support element 24 and 26 as shown in FIG. 4. Once the extremities 75 are detached from the respective support elements 24 an 26 and further, once the sleeve elements 77 have been removed, the entire roof structure may become detached or merely disposed in folded over position relative to the adjacently positioned and interconnected cross bar portions 24' and 26'. This is done to place the carriage assembly in its compacted, inoperative position as shown in FIG. 3.

Figure 2:
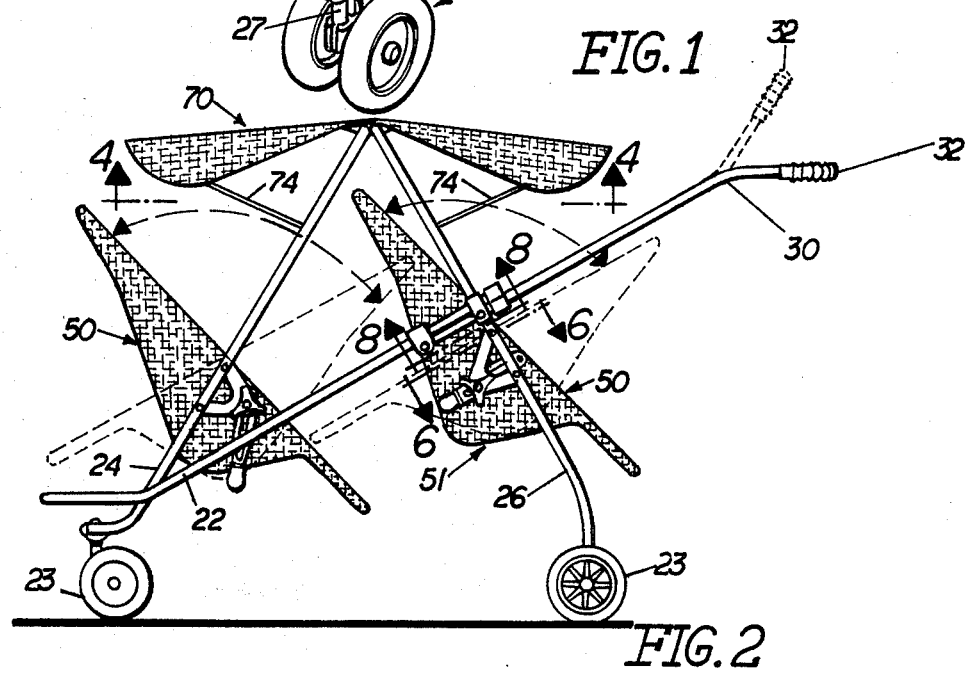
FIG. 2 is a side view of the carriage assembly wherein the different positions of the two seat assemblies are shown in solid and broken lines.

Turning to FIGS. 1 and 2, the carriage assembly comprises individual and spaced apart seat assemblies 50 and 51. Each of the seat assemblies includes a supporting frame 60 defining a peripheral portion of the seat assembly and disposed in substantially surrounding relation to the body support portion generally indicated as 52. More specifically, the body support portion 52 is made from a flexible material and includes a seat 53 and a backrest 55 interconnected to one another so as to support an occupant therein. A safety harnass or straps 54 and 56 are attached to the body support portion 52 and arranged in a manner to eliminate the possibility of an occupant falling from the seat assemblies 50 or 51. A connecting belt 58 serves to attach the straps 54 and 56 about the occupant as desired. It should be noted that the body support portions 52 are structured so as to pass through and depend from the support frame 60 forming the periphery of the seat assembly 50 and 51. Each of the body support portions 52 are structured to extend through the surrounding peripheral support frame 60. An important structural feature of the present invention is the free pivotal movement of each of the seat assemblies 50 and 51 relative to their individual supporting elements 24 and 26 respectively. As will be explained in greater detail hereinafter, each of the seat assemblies and more particularly the supporting frames 60 is pivotally connected to their respective supporting element. This allows selective and independent movement of each seat assembly into a front facing or rear facing position relative to the carriage assembly 20. The rear of the carriage assembly is considered the handle portion and the front of the carriage assembly is considered the cross bar 22' of the secondary support portion 22. Therefore, as shown in solid lines in FIG. 2 both of the seat assemblies 50 and 51 may face rearwardly or forwardly (FIG. 1) or towards or away from one another as is readily apparent.

Figure 6:
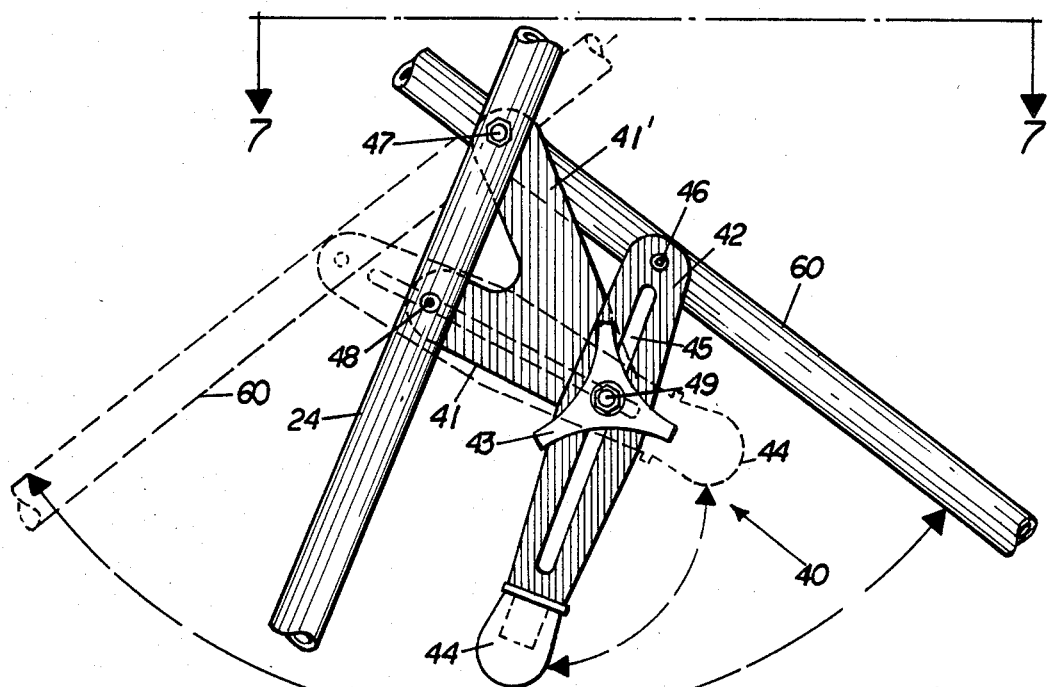
FIG. 6 is a cutaway view showing structural details of the positioning means of the present invention wherein a various positions of the support frame of the seat assembly is shown in broken lines.
Figure 7:
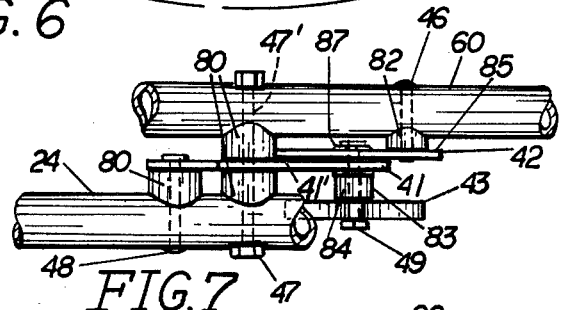
FIG. 7 is a top view along line 7—7 of FIG. 6.

Positioning and securement of each of the seat assemblies is accomplished through the provision of a positioning means as generally indicated as 40 and as shown in detail in FIGS. 6 and 7. For purposes of clarity, only a single positioning means will be described in detail as represented in FIG. 7. However, it should be noted that a positioning means 40 of the type described is located on each side of each seat assembly in interconnecting relation between the correspondingly positioned legs of each of the support elements 24 and 26. This is best shown in FIG. 1 wherein it is noted that the connecting assemblies 40 on the opposite side of the carriage assembly as shown in FIG. 1 are not clearly represented.

With reference to FIGS. 6 and 7, each of the positioning means includes a first link 41 fixedly attached as at 47 and 48 by appropriate connectors to the respective support element 24. As shown in FIG. 7, spacer members 80 are structured to protrude outwardly from the support frame 60 and support element 24 so as to properly position the components of the positioning means. Further with regard to FIG. 7, each side of the support frame 60 is pivotally connected to the support element 24 so as to rotate or pivot about the shaft portion of the connector 47 indicated as 47' which also passes through the upper finger 41' of the first link 41. The positioning means includes a second link 42 pivotally connected to each side of the support frame 60 as at 46. Similarly, a spacer 82 properly positions the second link 42 into mating engagement relative to the corresponding surface of the first link 41 (see FIG. 3). The positioning means further comprises a connecting means including rotatable knob 43 secured to a threaded shaft 84 extending through spacer 83 and exiting on the surface 85 of the second link 42. An interior threaded washer or nut member 87 is attached in threaded engagement about the shaft 84. Accordingly, rotation of the knob 43 forces the mating surface of first and second link 41 and 42 respectively into frictional engagement with one another which in turn fixes the relative positions of the first and second link to one another. This in turn fixes the relative positions of support frame 60 to its support element 24. Second link 42 includes an elongated slot 45 integrally formed therein and extending along at least a portion of the length thereof. Therefore, this slot is both slidably and rotatably disposed in surrounding relation to the threaded shaft 84 and on the interior of the spacer 83 such that the correspondingly positioned surfaces of the links 41 and 42 are forced into frictional, mating engagement with one another. However, when the knob is loosened to allow movement between the first and second links 41 and 42, the support frame and accordingly the seat assembly is allowed to be positioned such that the seat assembly faces either the front or the rear. Further, relative positionings of the links 41 and 42 may serve to orient the seat assembly at a somewhat inclined position or alternately at a somewhat upright sitting position depending upon the desires of the occupant. Selective positioning of link 42 occurs by grasping the handle 44 formed at one end of the second link 42 and positioning in the position represented by broken lines and indicated by the attendant directional arrow. Such movement causes the pivotal movement of the support frame 60 and accordingly the seat assemblies 50 and 51 to the position of support element 60 represented in broken lines in FIG. 6.

It is therefore seen that either of the seat assemblies 50 or 51 may be oriented to face either the front or rear of the carriage assembly. When, for example, the seat assembly 50 is moved from the position shown in FIG. 1, facing front, to the position shown in FIG. 2, facing rearwardly, the body support portion 52 reverses itself and passes through the support frame 60 to assume the body supporting position as shown in both FIGS. 1 and 2. It is therefore seen that the body support portion 52 is effectively reversible and the occupant is supported on either side of the body support portion 52 dependent upon the orientation of the seat assembly as described above.

Further structural features of the present invention are shown in FIG. 2 and include the ability to raise or re-orient the cros bar 33 of the handle portion 30 and the attached gripping elements 32. As shown in broken lines in FIG. 2, the cross bar is disposed in an angular orientation relative to the longitudinal axis of each of the legs 31. Accordingly, the cross bar 33 and gripping elements 32 may be angled upwardly by merely reversing the connection of the handle portion 30 and attaching the opposite legs 31 to opposite sides of the secondary support portion 22. With the handle or grip element 32 arranged in its upwardly angular orientation, the carriage assembly is better suited for taller people when propelling the carriage.

What is claimed is:

1. A carriage assembly of the type designed to simultaneously carry more than one occupant, said carriage assembly comprising:
   (a) frame means including wheel means attached in supporting relation thereto, said frame means structured for disposition between an extended, operative position and a collapsed, inoperative position,
   (b) seat means including a first seat assembly and a second seat assembly movably mounted on said frame means in substantially tandem relation to one another,
   (c) said frame means including a first support element and a second support element disposed in supporting relation to said first and said second seat assemblies respectively,
   (d) each seat assembly pivotally attached to respective ones of said first and said second support elements and selectively movable relative thereto into a front and rear facing position relative to said carriage assembly,
   (e) said frame means further comprising a secondary support portion disposed in substantially surrounding relation to said seat means, and a handle portion pivotally connected to said secondary support portion,
   (f) said extended operative position defined by substantially linear, extended and aligned relation between said secondary support portion and said handle portion, said inoperative position defined by pivotal movement of said handle portion relative to said secondary support portion and side-by-side disposition of said first and said second seat assemblies between said handle portion and said second support portion,
   (g) said first and said second support elements being disposed at a substantially angular orientation extending from a junction of interconnection therebetween to a front and a rear of said carriage assembly respectively, said first and said second support elements disposed to collectively define a substantially A-frame configuration, and
   (h) shield means attached in interconnected relation to both said first and said second support elements and extending outwardly from opposite sides of said junction in substantially overhanging relation to each of said seat assemblies, whereby said seat assemblies are shielded from the sun's rays.

2. A carriage assembly as in claim 1 wherein each of said support elements comprise a substantially U-shaped configuration including two spaced apart substantially parallel leg elements, each terminating in a free end, and a cross member integrally interconnecting said leg elements opposite to said free ends; said cross members of each support element interconnected at said junction, said free ends of said support elements secured to said wheel means.

3. A carriage assembly as in claim 2 wherein each of said first and said second seat assemblies is supported in suspended attachment between the leg elements of each of said first and said second support elements respectively, each seat assembly selectively pivotal between respective ones of said leg members into oppositely facing positions.

4. A carriage assembly of the type designed to simultaneously carry more than one occupant, said carriage assembly comprising:
   (a) frame means including wheel means attached in supporting relation thereto, said frame means structured for disposition between an extended, operative position and a collapsed, inoperative position,
   (b) seat means including a first seat assembly and a second seat assembly movably mounted on said frame means in substantially tandem relation to one another,
   (c) said frame means including a first support element and a second support element disposed in supporting relation to said first and said second seat assemblies respectively,
   (d) each seat assembly pivotally attached to respective ones of said first and said second support elements and selectively movable relative thereto into a front and rear facing position relative to said carriage assembly,
   (e) said frame means further comprising a secondary support portion disposed in substantially surrounding relation to said seat means, and a handle portion pivotally connected to said secondary support portion,
   (f) said extended operative position defined by substantially linear, extended and aligned relation between said secondary support portion and said handle portion, said inoperative position defined by pivotal movement of said handle portion relative to said secondary support portion and side-by-side disposition of said first and said second seat assemblies between said handle portion and said second support portion,
   (g) each of said seat assemblies comprising a support frame including at least a peripheral portion of each of said seat assemblies, a body support portion secured in supported, substantially depending relation from said support frame, said body support portion made from a substantially flexible material and selectively positionable on opposite sides of said support frame and structured for passage therethrough into a supporting position for an occupant, and
   (h) each of said support frames being pivotally attached along opposite lateral portions thereof to correspondingly disposed portions of respective ones of said first and said second support elements, each of said support frames being angularly oriented relative to said respective support elements and disposable to support an occupant within said body support portion selectively in a reclining and substantially upright sitting position.

5. A carriage assembly as in claim 4 further comprising positioning means disposed on said frame means in interconnecting relation between each seat assembly and respective ones of said support elements supporting each of said seat assemblies, each positioning means comprising a first link fixedly attached to one of said support elements, a second link movably connected to both said first link and the respective one of said seat assemblies, whereby movement of said second link relative to said first link causes pivotal movement of said seat assembly relative to said respective support element.

6. A carriage assembly as in claim 5 wherein said second link is pivotally connected to said seat assembly and both slidably and rotatably connected to said first link, said first and said second link cooperatively disposed and sturctured to define the position of said seat assembly relative to respective ones of said support elements and further being dependent on the position of said second link relative to said first link.

7. A carriage assembly as in claim 6 wherein said positioning means further comprises a connecting assembly structured and disposed to interconnect said first and said second links and including a shaft disposed common to both said first and said second link and defining an axis of rotation of said second link relative to said first link; said second link including an elongated channel integrally formed in said second link and disposed in surrounding and movable relation to said shaft, said connecting assembly further structured for forcing abutting engagement between mating surfaces of said first and said second links, whereby relative movement between said first and said second links is prevented and relative position therebetween is fixed upon forced engagement between mating surfaces of said first link and said second link.

8. A carriage assembly as in claim 7 wherein a positioning means is disposed on each side of each of said seat assemblies in interconnecting relation between said support frame and respective ones of said support elements.

9. A carriage assembly of the type designed to simultaneously carry more than one occupant, said carriage assembly comprising:
 (a) frame means including wheel means attached in supporting relation thereto, said frame means structured for disposition between an extended, operative position and a collapsed, inoperative position,
 (b) seat means including a first seat assembly and a second seat assembly movably mounted on said frame means in substantially tandem relation to one another,
 (c) said frame means including a first support element and a second support element disposed in supporting relation to said first and said second seat assemblies respectively,
 (d) each seat assembly pivotally attached to respective ones of said first and said second support elements and selectively movable relative thereto into a front and rear facing position relative to said carriage assembly,
 (e) said frame means further comprising a secondary support portion disposed in substantially surrounding relation to said seat means, and a handle portion pivotally connected to said secondary support portion,
 (f) said extended operative position defined by substantially linear, extended and aligned relation between said secondary support portion and said handle portion, said inoperative position defined by pivotal movement of said handle portion relative to said secondary support portion and side-by-side disposition of said first and said second seat assemblies between said handle portion and said second support portion,
 (g) attachment means disposed and structured for interconnecting attachment to both said secondary support portions and said handle portion for securement thereof in a substantially linear, extended position, and
 (h) said attachment means being secured to one of said secondary support portions and said handle portion and removably securable to the other of said latter portions.

10. A carriage assembly as in claim 9 wherein said attachment means is secured to said second support portion and removably attached to said handle portion, said attachment means secured to both said latter portions for maintenance in said linear extended position and removed from said second support portion for pivotal disposition of said two latter portions relative to one another for disposition of said carriage assembly into said collapsed, inoperative position.

11. A carriage assembly as in claim 9 wherein each of said second support portion and said handle portion comprises a substantially U-shaped configuration including two spaced apart substantially parallel legs having a free end; said linear, extended position defined by fixed interconnection of correspondingly disposed free ends of said legs of said second support portion and said handle portion.

12. A carriage assembly as in claim 9 wherein said attachment means comprises a plurality of connecting elements secured substantially adjacent one free end of said handle portion and removably attachable substantially adjacent a correspondingly positioned free end of said secondary support portion.

13. A carriage assembly as in claim 12 wherein one of said plurality of connecting elements comprises a ring portion disposed in surrounding relation to said handle portion and further including a cap element disposed and configured for enclosing engagement over the extremity of said free end of said secondary support portion; said plurality of connecting elements comprising a second connecting element including a ring portion disposed in surrounding relation adjacent said free end of said handle portion and further including a snap connector configured for removable positioning of said secondary support portion thereon.

14. A carriage assembly as in claim 9 wherein each of said first support assembly, said second support assembly, said secondary support portion and said handle portion are defined by a substantially U-shaped configuration having a cross bar disposed between two spaced apart substantially parallel legs, each of said legs having a free end; said first support element and said second support element disposed for interconnection of their respective cross bars and further each free end of each of said first and said second support elements interconnected to wheel means so as to movably support said carriage assembly over the surface being traveled; said secondary support portion and said handle portion interconnected to one another along respectively positioned free ends of each leg thereof, each of said first and second support elements and secondary support portion and handle portion disposed in attached, interconnected relation to at least one other of said elements so as to collectively define said frame means.

* * * * *